(12) United States Patent
He et al.

(10) Patent No.: US 10,445,594 B2
(45) Date of Patent: Oct. 15, 2019

(54) ONBOARD DISPLAY SYSTEM

(71) Applicants: BOE TECHNOLOGY GROUP CO., LTD., Beijing (CN); CHENGDU BOE OPTOELECTRONICS TECHNOLOGY CO., LTD., Chengdu, Sichuan Province (CN)

(72) Inventors: Wei He, Beijing (CN); Seung Yik Park, Beijing (CN)

(73) Assignees: BOE TECHNOLOGY GROUP CO., LTD., Beijing (CN); CHENGDU BOE OPTOELECTRONICSS TECHNOLOGY CO., LTD., Chengdu, Sichuan Province (CN)

( * ) Notice: Subject to any disclaimer, the term of this patent is extended or adjusted under 35 U.S.C. 154(b) by 130 days.

(21) Appl. No.: 15/209,311

(22) Filed: Jul. 13, 2016

(65) Prior Publication Data
US 2017/0270367 A1  Sep. 21, 2017

(30) Foreign Application Priority Data

Mar. 17, 2016 (CN) .......................... 2016 1 0153818

(51) Int. Cl.
  *B60R 1/00* (2006.01)
  *H04N 5/232* (2006.01)
  (Continued)

(52) U.S. Cl.
  CPC .......... *G06K 9/00791* (2013.01); *B60K 35/00* (2013.01); *B60R 1/00* (2013.01);
  (Continued)

(58) Field of Classification Search
  CPC ....................................................... B60R 11/04
  (Continued)

(56) References Cited

U.S. PATENT DOCUMENTS

| 4,373,130 A | * | 2/1983 | Krasborn | .......... B32B 17/10036 |
| | | | | 219/203 |
| 5,495,224 A | * | 2/1996 | Adar | ..................... B60R 25/016 |
| | | | | 116/67 R |

(Continued)

FOREIGN PATENT DOCUMENTS

| CN | 103217165 A | 7/2013 |
| CN | 103253195 A | 8/2013 |

(Continued)

OTHER PUBLICATIONS

Second Chinese Office Action, for Chinese Patent Application No. 201610153818.6, dated Oct. 31, 2017, 9 pages.

(Continued)

*Primary Examiner* — Paulos M Natnael
(74) *Attorney, Agent, or Firm* — Kinney & Lange, P.A.

(57) ABSTRACT

Embodiments of the present invention relate to an onboard display system for solving the problem of display image with poor clarity in the prior art, achieving a better grasp to situation outside the vehicle and driving safety of the driver. The onboard display system includes a camera module and a display. The camera module is installed at a predetermined position outside the vehicle for taking traffic images during driving and sending them to the display. The display is arranged inside the vehicle and adhered to the front windshield of the vehicle or hang before the front windshield of the vehicle for displaying the traffic images it received.

9 Claims, 3 Drawing Sheets

(51) Int. Cl.
*H04N 5/247* (2006.01)
*B60K 35/00* (2006.01)
*G06K 9/00* (2006.01)
*G06T 5/00* (2006.01)
*H04N 5/33* (2006.01)

(52) U.S. Cl.
CPC ......... *G06T 5/002* (2013.01); *H04N 5/23293* (2013.01); *H04N 5/247* (2013.01); *B60K 2370/152* (2019.05); *B60K 2370/1529* (2019.05); *B60K 2370/177* (2019.05); *B60K 2370/334* (2019.05); *B60K 2370/77* (2019.05); *B60R 2300/105* (2013.01); *B60R 2300/205* (2013.01); *B60R 2300/80* (2013.01); *H04N 5/33* (2013.01)

(58) Field of Classification Search
USPC .......................................................... 348/148
See application file for complete search history.

(56) References Cited

U.S. PATENT DOCUMENTS

| | | | | |
|---|---|---|---|---|
| 5,506,595 | A * | 4/1996 | Fukano | B60K 35/00 345/7 |
| 5,589,814 | A * | 12/1996 | Smith, Jr. | B60R 25/00 116/42 |
| 7,015,944 | B2 * | 3/2006 | Holz | G01S 17/936 348/139 |
| 8,412,413 | B1 * | 4/2013 | Stark | G02B 27/01 340/980 |
| 2002/0017802 | A1 * | 2/2002 | Edwards | B60R 25/016 296/136.01 |
| 2008/0212215 | A1 * | 9/2008 | Schofield | B60C 23/00 359/844 |
| 2009/0290369 | A1 * | 11/2009 | Schofield | B60C 23/00 362/494 |
| 2012/0062744 | A1 * | 3/2012 | Schofield | B60C 23/00 348/148 |
| 2013/0107045 | A1 | 5/2013 | Soderlind et al. | |
| 2013/0229522 | A1 * | 9/2013 | Schofield | B60C 23/00 348/148 |
| 2014/0340516 | A1 | 11/2014 | Vojtisek et al. | |
| 2016/0379412 | A1 * | 12/2016 | Butler | G06T 19/006 345/633 |
| 2017/0003134 | A1 * | 1/2017 | Kim | B60R 1/00 |
| 2017/0013188 | A1 * | 1/2017 | Kothari | B60R 11/0235 |
| 2017/0050641 | A1 * | 2/2017 | Park | B60W 30/18109 |
| 2017/0134662 | A1 * | 5/2017 | Kosaka | H04N 5/23293 |
| 2017/0187963 | A1 * | 6/2017 | Lee | G06F 3/013 |
| 2017/0237946 | A1 * | 8/2017 | Schofield | H04N 7/183 348/148 |
| 2017/0313248 | A1 * | 11/2017 | Kothari | B60K 35/00 |

FOREIGN PATENT DOCUMENTS

| | | |
|---|---|---|
| CN | 104163134 A | 11/2014 |
| CN | 104260669 A | 1/2015 |
| CN | 104267499 A | 1/2015 |

OTHER PUBLICATIONS

First Chinese Office Action, for Chinese Patent Application No. 201610153818.6, dated Jun. 23, 2017, 11 pages.

* cited by examiner

ONBOARD DISPLAY SYSTEM

CROSS-REFERENCE TO RELATED APPLICATION(S)

This application claims the benefit of Chinese Patent Application No. 201610153818.6 filed on Mar. 17, 2016 in the State Intellectual Property Office of China, the whole disclosure of which is incorporated herein by reference.

BACKGROUND OF THE INVENTION

Field of the Invention

The present invention relates to a field of onboard display technique, especially to an onboard display system.

Description of the Related Art

Currently, most of display systems inside a vehicle are a dashboard display for displaying speed, engine rpm, fuel consumption, tire pressure and so on. The central console display inside the vehicle serves to display navigation data or as an output screen of the onboard Digital Video Disk (DVD), MP4 etc. When it is used for navigation, the driver needs to move his sight line away from the region of a front windshield, resulting in a potential safety hazard. When it is used for entertainment, as the navigation and the onboard audio-video equipment share one same screen, it usually interferes with the navigation requirement during travelling. During parking, the current screen is too small, reducing the entertainment experience.

With development of the technology, a Head Up Display (HUD) system is increasingly used in the car. The HUD system on the car can display important information, such as speed, engine rpm, fuel consumption, tire pressure, navigation as well as information of an external intelligent device onto the front windshield of the vehicle within the driver's vision field in real time, such that the driver can see the traveling information without bowing his head, avoiding distracting the attention to the road ahead; while the driver does not need to adjust his eyes between observing the distant road and the meters nearby, which can avoid eye-straining, greatly enhance driving safety and improve driving experience.

Currently, the HUD technology is achieved by means of projection imaging, in which the projection imaging performs projection displaying with the front windshield of the vehicle or an additional optical element. When the additional optical element is used for projection displaying, as the space inside the vehicle is limited, the projected image can only be displayed in a part of the front windshield of the vehicle, the area to be viewed is relatively small, reducing the entertainment experience. Further, an optical path with an additional optical element is complex and costly.

It is the simplest configuration to use the front windshield to reflect images. Generally, the front windshield is a laminated glass which is constituted by two pieces of substrate of glass with a curvature between which a thermoplastic polymer film is provided. Reflection occurs when the light emitted by a projection source of the HUD system irritates on two surfaces of the laminated glass which are in contact with the air. The reflected images on the two surfaces will be shifted from each other such that two images interfering to each other are formed, which is more problematic in case that the laminated glass is thicker and which greatly limits the sharpness of the image displayed by projection.

In summary, although the current HUD technology can achieve the effect that the driver can see the travelling information without bowing his head, avoiding distracting the attention to the road ahead; while the driver does not need to adjust his eyes between observing the distant road and the meters nearby, avoiding eye-straining, greatly enhancing driving safety and improving driving experience, the existing HUD has a problem that the image formed has a poor definition.

SUMMARY OF THE INVENTION

Accordingly, embodiments of the present invention provide an onboard display system for solve the problem that the image formed by displaying has a low resolution so as to achieve a better grasp of situation outside the vehicle by the driver and driving safety of the driver.

According to an aspect of the present invention, there is provided an onboard display system, comprising a camera module and a display, the camera module is installed at a predetermined position outside the vehicle for taking traffic images during travelling and sending them to the display;

the display is arranged inside the vehicle and adhered to the front windshield of the vehicle or hangs before the front windshield of the vehicle for displaying the traffic images received.

The onboard display system provided by embodiments of the present invention comprises a camera module and a display, the camera module serves to take traffic images during driving and send them to the display; the display is arranged inside the vehicle and adhered to the front windshield of the vehicle or hang before the front windshield of the vehicle for displaying the traffic images received. As the driver can observe the traffic image through the display in the onboard display system provided by the embodiment of the present invention, it improves the definition of images, achieving a better grasp of situation outside the vehicle by the driver and driving safety of the driver, in comparison with the current HUD technology in which the front windshield is used to reflect the projected images.

According to an embodiment, the camera module comprises a plurality of cameras, which are installed at outside of the front windshield of the vehicle, and/or installed at outside of the rear windshield of the vehicle.

According to an embodiment, the cameras comprise infrared cameras.

According to an embodiment, the display is an organic light emitting display or LCD.

According to an embodiment, the organic light emitting display is of the same size as that of the front windshield of the vehicle and the LCD is of the same size as that of the front windshield of the vehicle.

According to an embodiment, the organic light emitting display is an organic light emitting display provided with a touch structure and the LCD is a LCD provided with a touch structure.

According to an embodiment, the onboard display system further comprises a projection system which is arranged on the central console of the vehicle or on an inside of the roof of the vehicle;

the camera module further serves to send the traffic images to the projection system;

the projection system serves to project the received traffic image onto entire front windshield of the vehicle.

According to an embodiment, the projection system comprises a plurality of mini projectors.

According to an embodiment, the onboard display system further comprises an image processing module which serves to receive the traffic image sent from the camera module, to process the received traffic image and to send the processed traffic image to the display or the projection system.

According to an embodiment, the image processing module serves to perform distortion correction, brightness adjustment and contrast adjustment to the received traffic images.

DETAILED DESCRIPTION OF PREFERRED EMBODIMENTS

Figure 1:
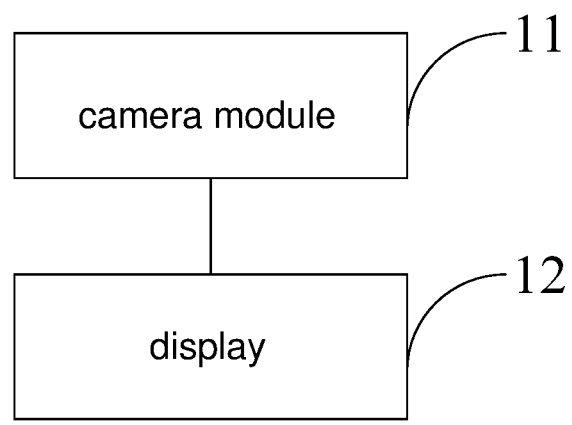
FIG. 1 is a block diagram of the onboard display system provided by an embodiment of the present invention.

The embodiments of the present invention provide an onboard display system for solve the problem that the image formed by displaying has a low definition so as to achieve a better grasp of situation outside the vehicle by the driver and driving safety of the driver.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Below, the onboard display system provided by embodiments of the present invention is described in detail with reference to the Figures.

As shown in FIG. 1, the onboard display system provided by an embodiment of the present invention comprises a camera module 11 and a display 12, the camera module 11 is installed at a predetermined position outside the vehicle for taking traffic images during traveling and sending them to the display 12; the display 12 is arranged inside the vehicle and adhered to the front windshield of the vehicle or hang before the front windshield of the vehicle for displaying the traffic images it received.

Specifically, the camera module in an embodiment of the present invention comprises a plurality of cameras which may comprise a HD camera commonly used in the prior art. According to an embodiment, the cameras are installed at outside of the front windshield of the vehicle, and/or installed at outside of the rear windshield of the vehicle. Further, the cameras in an embodiment of the present invention may be installed in a position needed to be observed by the driver such as a rearview mirror.

According to an embodiment, the cameras in an embodiment of the present invention comprise infrared cameras. If infrared cameras are used during driving, one can achieve safe driving at night or in fog or other special circumstances. The cameras may also use other cameras with night vision which can achieve safe driving at night.

Specifically, the display in an embodiment of the present invention may use a flexible display which is adhered to the front windshield of the vehicle with a adhering technology, while the display in embodiments of the present invention may also use a normal display which is directly hang before the front windshield of the vehicle.

Below, the case that the display is adhered to the front windshield of the vehicle in embodiments of the present invention is described in detail with reference to the Figures.

Figure 2A:
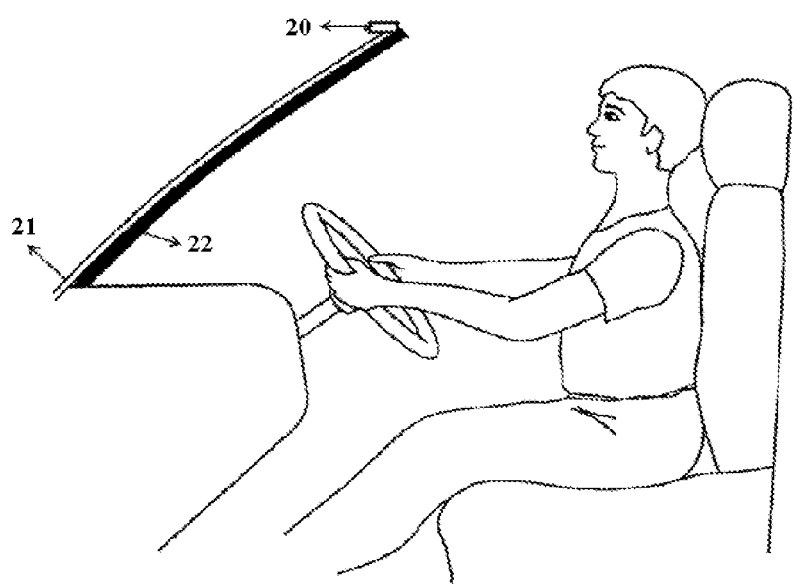
FIG. 2(a) is a schematic diagram of the arrangement position of the display of the onboard display system provided by an embodiment of the present invention.

As shown in FIG. 2(a), the display 22 in an embodiment of the present invention is adhered to the front windshield of the vehicle for showing the traffic images it receives. In the figure, it shows the case that the camera 20 is installed outside of the front windshield of the vehicle. The front windshield of the vehicle in embodiments of the present invention may be transparent or may be opaque. The display may be transparent or may be opaque.

According to an embodiment, as shown in FIG. 2(a), the display 22 is an organic light emitting display or a LCD. When the display 22 is an organic light emitting display, the organic light emitting display is of the same size as that of the front windshield 21 of the vehicle. When the display 22 is a LCD, the LCD is of the same size as that of the front windshield 21 of the vehicle. When the organic light emitting display or the LCD is of the same size as that of the front windshield 21 of the vehicle, the driver may obtain a larger viewing field. Of course, the display 22 in embodiments of the present invention may be other kind of display, the size of which may be different from that of the front windshield 21 of the vehicle, and may be set according to the actual requirement of the driver.

In embodiments of the present invention, the display is arranged on the front windshield of the vehicle, the view field of the driver covers directly the display during driving and there is no problem that the image formed has a poor definition as in the existing HUD technology. Further, during parking, the display in embodiments of the present invention serves as an entertainment feature and can bring about more entertainment experience.

According to an embodiment, the organic light emitting display is an organic light emitting display provided with a touch structure and the LCD is a LCD provided with a touch structure. Thus, the display may be touch operated and can bring about more entertainment experience during parking.

Figure 2B:
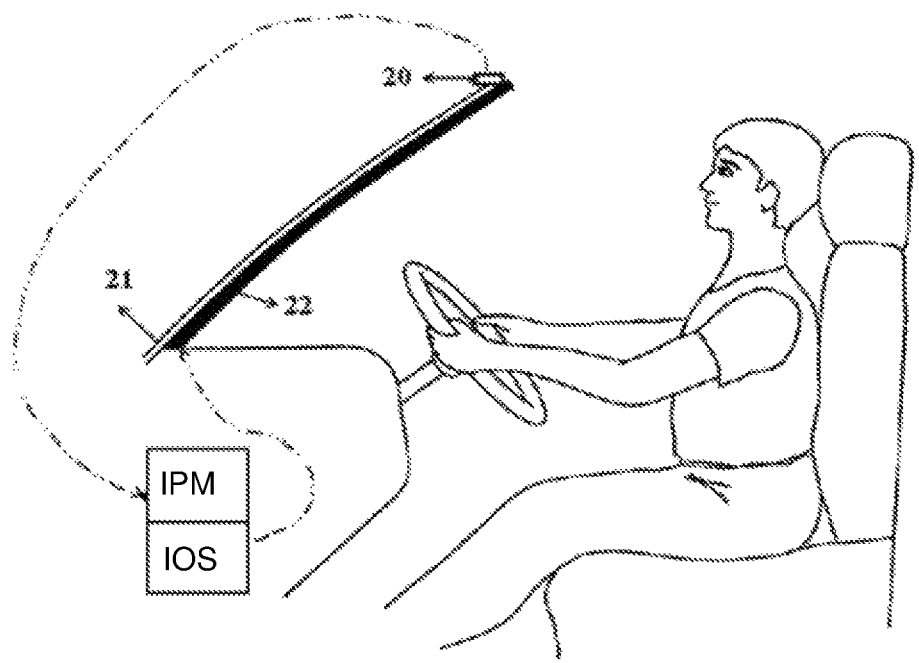
FIG. 2(b) is a schematic diagram of the onboard display system provided by an embodiment of the present invention when it comprises an image processing module.

Specifically, as shown in FIG. 2(b), the onboard display system in an embodiment of the present invention further comprises an image processing module which serves to receive the traffic image sent from the camera module 20, to process the received traffic image and to send the processed traffic image to the display 22. When it being implemented, the image processing module in an embodiment of the present invention serves to perform distortion correction, brightness adjustment and contrast adjustment to the received traffic images sent from the cameras 20. After that, it sent the traffic images to the display, which is more suitable for observation by the driver.

Further, as shown in FIG. 2(b), an intelligent operating system (IOS) such as Android system is integrated into the onboard display system in an embodiment of the present invention which can control the display to achieve multi-screen display and partial display and meet some of the entertainment needs of the co-pilot. The image processing module (IPM) may be integrated into the intelligent operating system and the intelligent operating system may be integrated into the central console of the vehicle.

Figure 3A:
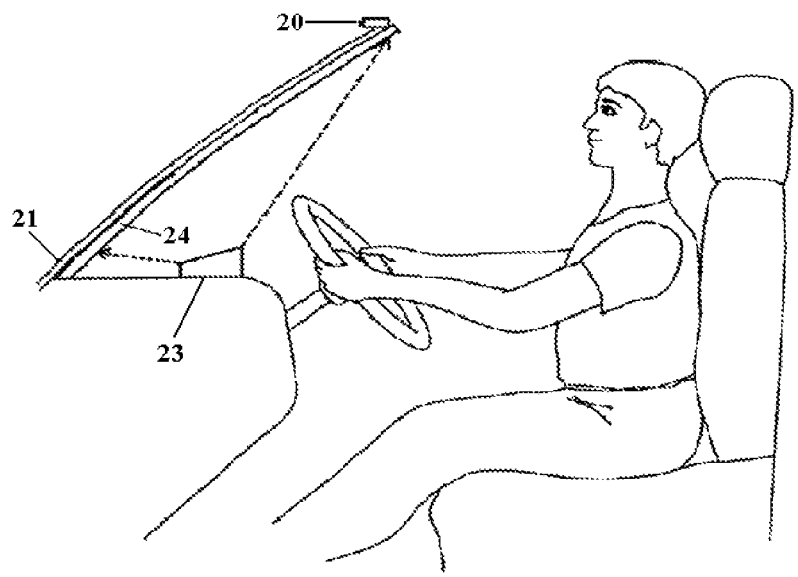
FIG. 3(a) is a schematic diagram of the onboard display system provided by an embodiment of the present invention when it comprises a projection system.

When being implemented, as shown in FIG. 3(a), the onboard display system in an embodiment of the present invention further comprises a projection system which is arranged on the central console 23 of the vehicle or on an inside of the roof of the vehicle (not shown in the figure); the camera module in the embodiment further serves to send the traffic images to the projection system; the projection system serves to project the received traffic image onto entire front windshield 21 of the vehicle, achieving a real time observation to the situation outside of the vehicle.

The projecting area 24 of the front windshield 21 of the vehicle in an embodiment of the present invention is shown as the area indicated by two dotted lines with arrows in the figure and the projecting area on the front windshield 21 of the vehicle is of the same size as that of the front windshield 21 of the vehicle. Therefore, the projection system in the embodiment of the present invention may obtain a larger viewing field for the driver in comparison with the projecting displaying with an additional optical element in the prior art.

According to an embodiment, the projection system comprises a plurality of mini projectors.

When being implemented, a touch structure may be provided separately on the front windshield of the vehicle and it cooperates with other projecting images such as the traffic images projected on the front windshield 21 of the vehicle to achieve touch operations. It may bring about more entertainment experience for the user during parking.

Figure 3B:
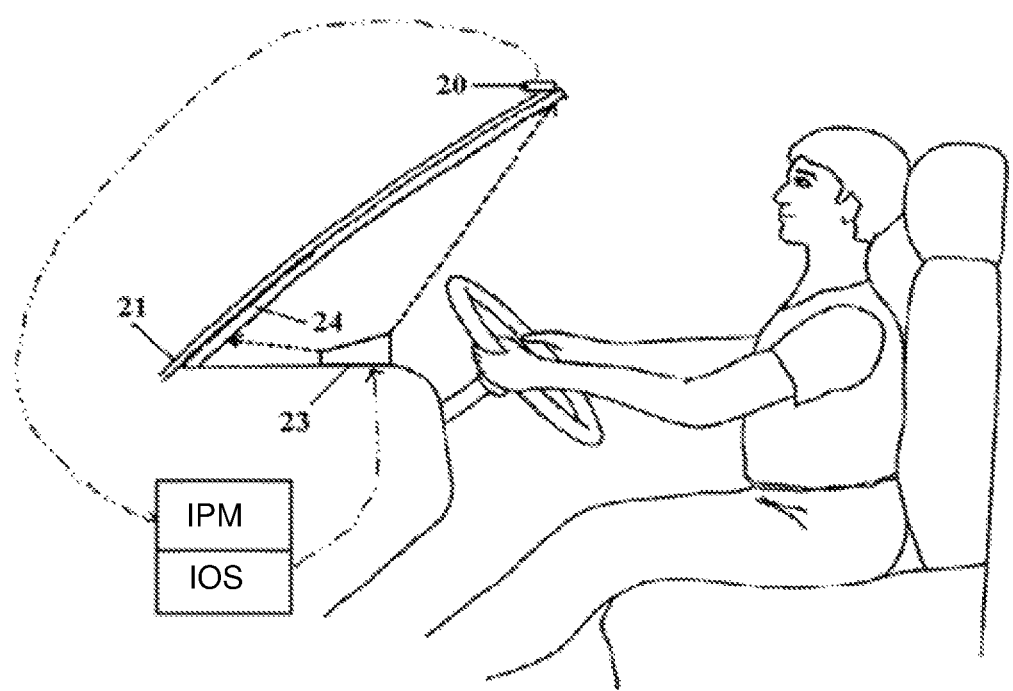
FIG. 3(b) is another schematic diagram of the onboard display system provided by an embodiment of the present invention when it comprises an image processing module.

Specifically, as shown in FIG. 3(b), the onboard display system in an embodiment of the present invention further comprises an image processing module (IPM) which serves to receive the traffic image sent from the camera module 20, to process the received traffic image and to send the processed traffic image to the projection system. When it being implemented, the image processing module in the embodiment of the present invention serves to perform distortion correction, brightness adjustment and contrast adjustment to the received traffic images sent from the cameras 20. After that, it sent the traffic images to the projection system, which is more suitable for observation by the driver.

Further, as shown in FIG. 3(b), an intelligent operating system (IOS) such as Android system is integrated into the onboard display system in an embodiment of the present invention which can control the traffic images or other images desired projected on the front windshield of the vehicle to achieve multi-screen display and partial display and meet some of the entertainment needs of the co-pilot. The image processing module may be integrated into the intelligent operating system and the intelligent operating system may be integrated into the central console of the vehicle.

The display in embodiments of the present invention may show images taken by the cameras clearly, which is less environmental sensitive and it can integrate a touch structure on the display and is easy to be operated. However, it will be relatively costly with integration.

The projecting system in embodiments of the present invention is more environmental sensitive. However, it consumes less power and can be achieved with lower cost and is easier to be achieved for onboard technology.

In embodiments of the present invention, the photography and the displaying technology are used in combination, achieving a real time observation to the situation outside the vehicle by displaying inside the vehicle. The driver can obtain a larger viewing field and more information, solving the problem in current HUD technology.

In summary, the onboard display system provided by embodiments of the present invention comprises a camera module and a display, the camera module is installed at a predetermined position outside the vehicle for taking traffic images during driving and sending them to the display; the display is arranged inside the vehicle and adhered to the front windshield of the vehicle or hang before the front windshield of the vehicle for displaying the traffic images it received. As the driver can observe the traffic image through the display in the onboard display system provided by the embodiment of the present invention, it improves the definition of images, achieving a better grasp of situation outside the vehicle by the driver and driving safety of the driver, in comparison with the current HUD technology in which the front windshield is used to reflect the projected images.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. An onboard display system comprising a camera module and a display, wherein
   the camera module is installed at a predetermined position outside a vehicle for taking traffic images during driving and sending the traffic images to the display; and
   the display is arranged inside the vehicle and adhered to or hung from a front windshield of the vehicle, which is opaque, for displaying the traffic images received from the camera module during driving, so that a driver looking toward the front windshield will only see the traffic images on the display and not through the windshield;
   wherein the display is of the same size as that of the front windshield of the vehicle.

2. The onboard display system according to claim 1, wherein the camera module comprises a plurality of cameras, which are installed outside of the front windshield of the vehicle, and/or installed outside of a rear windshield of the vehicle.

3. The onboard display system according to claim 2, wherein the cameras comprise infrared cameras.

4. The onboard display system according to claim 1, wherein the display is an organic light emitting display or a LCD.

5. The onboard display system according to claim 4, wherein the-display is the organic light emitting display provided with a touch structure, or the display is the LCD provided with a touch structure.

6. The onboard display system according to claim 1, further comprising a projection system which is arranged on a central console of the vehicle or on an inside of a roof of the vehicle, wherein
   the camera module further serves to send the traffic images to the projection system; and
   the projection system serves to project the received traffic images onto an entirety of the front windshield of the vehicle.

7. The onboard display system according to claim 6, wherein the projection system comprises a plurality of mini projectors.

8. The onboard display system according to claim 6, further comprising an image processing module which serves to receive the traffic images sent from the camera module, to process the received traffic images and to send the processed traffic images to the display or the projection system.

9. The onboard display system according to claim 8, wherein the image processing module serves to perform distortion correction, brightness adjustment and contrast adjustment to the received traffic images.

\* \* \* \* \*